United States Patent [19]

Zuckerbrod et al.

[11] Patent Number: 5,336,573

[45] Date of Patent: Aug. 9, 1994

[54] BATTERY SEPARATOR

[75] Inventors: David Zuckerbrod, Baltimore; Richard T. Giovannoni, Columbia, both of Md.

[73] Assignee: W. R. Grace & Co.-Conn., New York, N.Y.

[21] Appl. No.: 95,134

[22] Filed: Jul. 20, 1993

[51] Int. Cl.⁵ .............................................. H01M 2/14
[52] U.S. Cl. .................................... 429/252; 429/136; 429/254
[58] Field of Search ............... 429/252, 254, 136, 251, 429/145; 428/98, 113, 114, 149, 221, 312.6; 425/381.2

[56] References Cited

U.S. PATENT DOCUMENTS

| | | | |
|---|---|---|---|
| 3,351,495 | 11/1967 | Larsen et al. | 429/254 X |
| 4,024,323 | 5/1977 | Versteegh | 429/249 |
| 4,287,276 | 9/1981 | Lundquist, Jr. et al. | 429/251 X |
| 4,529,677 | 7/1985 | Bodendorf | 429/252 |
| 4,699,857 | 10/1987 | Giovannoni et al. | 429/252 X |
| 5,126,219 | 6/1992 | Howard et al. | 429/252 |
| 5,154,988 | 10/1992 | Choi et al. | 429/252 X |

*Primary Examiner*—Anthony Skapars
*Attorney, Agent, or Firm*—Howard J. Troffkin

[57] ABSTRACT

A thin microporous sheet product useful as a battery separator composed of a highly filled polymeric matrix having a porous support sheet encapsulated between the sheet product's first and second major surfaces and to a process of forming the sheet product.

31 Claims, No Drawings

BATTERY SEPARATOR

BACKGROUND OF THE INVENTION

The subject invention is directed to a sheet product, and process of forming same, which is useful as separator components for batteries and to improved batteries containing the formed separator. More specifically, the present invention is directed to a thin, microporous sheet product composed of a highly filled polymeric matrix having a porous support sheet encapsulated between the sheet product's first and second major surfaces and to a process of forming the sheet product.

Membranes have been formed from various materials and used in various applications such as in ion exchange, osmotic and ultra filtration devices including desalinization, kidney dialysis, gas separation and other applications. Macro and microporous membranes have been used as a means of insulating and separating electrodes in battery devices. Each application provides an environment and a set of desired parameters which are distinct to the specific application.

Storage batteries have at least one pair of electrodes of opposite polarity and, in general, have series of adjacent electrodes of alternating polarity. The current flow between these electrodes is maintained by an electrolyte which may be acidic, alkaline, or substantially neutral depending upon the nature of the battery system. Separators are located in batteries between adjacent electrodes of opposite polarity to prevent direct contact between the oppositely charged electrode plates while freely permitting electrolytic conduction. Separator components have taken many forms. In a modern battery design, the separator is in the form of a thin sheet or film or more preferably, a thin envelope surrounding each electrode plate of one polarity.

It is generally agreed that one of the critical elements in a battery design is the separator component and, to be highly effective in the design, the separator should have a combination of features. The battery separator must be resistant to degradation and instability with respect to the battery environment, including the other battery components and the battery chemistry. Thus, the battery separator must be capable of withstanding degradation of strong acids (such as sulfuric acid commonly used in acid battery designs) or strong alkali (such as potassium hydroxide used in alkaline battery designs) and to do so under ambient and elevated temperature conditions. Further, the separator should also be of a thin and highly porous character to provide a battery of high energy density. Although battery separators of thick or heavy design have been utilized in the past, such materials detract from the overall energy density of the battery by reducing the amount of electrodes and/or electrolyte that can be contained in a predetermined battery configuration and size. Another criteria is that the battery separator must be capable of allowing a high degree of electrolytic conductivity. Stated another way an effective separator membrane must exhibit a low electrolytic resistance (resistance to ionic conduction) when in the battery. The lower the electrolytic resistance the better the overall battery performance will be. A still further criteria is that the separator should be capable of inhibiting formation and growth of dendrites. Such dendrite formation occurs during battery operation when part of the electrode material becomes dissolved in the electrolyte and, while passing through the separator, deposits therein to develop a formation which can, after a period of time, bridge the thickness of the separator membrane and cause shorting between electrodes of opposite polarity.

In addition to meeting the above combination of properties, it is highly desired to have a sheet product which is capable of exhibiting good physical properties of tensile strength, puncture resistance, flexibility and ductility to withstand the handling and processing without developing imperfections and cracks which would cause the sheet product to be unsuitable as a battery separator. Meeting this criteria is contrary to some of the above described properties (i.e. thin and light weight material and high porosity to permit good ionic conductivity versus high strength, puncture resistance and flexibility). In providing envelope type separators, these physical properties must also be accompanied by the ability of the material to be sealable by heat, or other means to provide a pocket design. As part of the physical property requirements, the sheet product must be capable of being formed as a cohesive material which retains this property throughout its service life.

In addition, recent changes in the manufacture and assembly of electrodes, enveloped electrodes and batteries are setting a higher level of performance standards for separators used in conjunction with them. For example, electrodes are being formed of an expanded metal grid on to which the electrode paste is placed. The electrode plates are then cut, assembled with separator, stacked, blocked, compressed and placed automatically into the battery case. The separator must be able to withstand the physical abuse generated by assembly of the separator into the battery. Moreover, the separator and electrode plate must be readily assembled without impediment by the separator design or character. Finally, batteries are being packed in higher densities which leave less free room for electrolyte and, therefore, separators must be capable of carrying a volume of electrolyte to ensure that the electrodes are kept in constant contact with electrolyte to operate at peak efficiency.

Various microporous membranes or sheet materials have been suggested for utilization as a battery separator. Separators conventionally used in present battery systems are formed of polymeric films which when placed in an electrolyte or an electrolyte system, are capable of exhibiting a high degree of conductivity while being stable to the environment presented by the battery system. The films include macroporous as well as microporous materials. The porosity permits transportation of the electrolyte. Examples of such separators include unfilled polyolefin sheets which have been stretched and annealed to provide microporosity to the sheet, such as is described in U.S. Pat. Nos. 3,558,764; 3,679,538; and 3,853,601. Because shrinkage occurs during processing and operation, some porosity may be lost in such unfilled separators and only reestablished by stretching the shrunken sheet back to its original size. In addition, other separators which include filler materials are known as, for example, disclosed in U.S. Pat. Nos. 3,351,495 and 4,024,323. In such filled polymer separators, the weight ratio of polymer to filler is typically limited to 1:2 to 1:3. When the filler content is increased above such amounts, the resultant separator loses its strength and flexibility and is weak and not readily processable, tending to fall apart during separator formation and battery assembly. Further, such polymer/filler compositions are friable materials and tend to exhibit electrolytic resistance which does not permit the formation of a highly efficient, high energy battery system.

It is highly desired to have a battery separator which is capable of exhibiting very low electrolytic resistance while at the same time providing the combination of desired properties described above.

SUMMARY OF THE INVENTION

The present invention is directed to a product, and a process of forming same, of a microporous sheet product, battery separators formed therefrom and to improved batteries which incorporate the thus formed battery separator. The subject separator comprises a microporous sheet composed of a substantially uniform mixture of a polymer and filler present in a weight ratio of from about 1:2.5 to 1:30 which has a fibrous sheet encapsulated therein.

DETAILED DESCRIPTION

The present invention provides a flexible sheet material having high void volume, porosity of a microporous nature and a configuration which substantially inhibits dendrite formation. The subject sheet product has high tensile strength and ductility sufficient to withstand handling during battery formation, is capable of being formed into desired shapes for use in a battery, is capable of exhibiting a high degree of stability to the battery environment over sustained periods of time and of allowing a high degree of electrolytic conductivity (low electrolytic resistance). Still further, the subject sheet material has been found to possess the ability to maintain its integrity and performance characteristics while being able to be formed into enveloped design separator (i.e. not crack or produce voids when being folded on itself and/or manipulated into this preferred design).

The sheet product of the present invention should be in the form of a very thin sheet of less than 50 mils, and preferably less than 10 mils in thickness. The thin sheet is bound by two major surfaces with a thickness therebetween. The body making up the thickness is composed of a substantially uniform composition formed from a polymer and particulate filler, each of which is fully described hereinbelow. The body, in addition, contains therein a porous sheet extending the length and breadth of the present sheet product and is encapsulated within the polymer/filler composition between the present sheet products two major surfaces.

For purposes of clarity, certain terms used in the present description and in the appended claims have the following meanings:

A "sheet" refers to scrim or woven, non-woven or knit fibrous porous material used as a component of the subject separator and which is dimensionally and physically stable in its length and width during processing and use.

A "battery" refers to a single electrochemical cell or, alternately, a multiple of electrochemical cells which are designed to operate in coordination with each other.

A "separator" is a component of a battery which provides a means of separation between adjacent electrode plates or members of opposite polarity. The separator of the present invention may have various configurations, such as a flat or ribbed material in the form of a membrane or envelope design capable of maintaining separation between electrodes.

A "sheet product" is intended to define a composite product of the present invention which is microporous, has a porous sheet encapsulated within the sheet product's thickness and has a form of highly filled polymer composite. The sheet product is suitable for use as a battery separator.

The sheet product of the present invention is composed of a fibrous sheet encapsulated in a polymer-filler matrix. The sheet product has a very high filler content and high porosity of a microporous nature. It has been found that the desired sheet product of the present invention can be formed by initially forming a substantially uniform processing mixture of 2 to 20 (preferably 3–15) weight percent of polymer, 20 to 75 weight percent of inert filler (with a polymer-filler weight ratio of from 1:2.5 to 1:30, preferably 1:4 to 1:25) and the remaining percentage of the mixture being a processing agent and minor amounts of antioxidants, colorants, wetting agents and the like. Each of the components of the processing mixture is fully described below.

The processing mixture should contain sufficient processing agent to impart fluidity to the mixture under the elevated temperature and pressure conditions required to form the initial sheet product. This is done by subjecting the processing mixture to high pressure extrusion utilizing a high pressure extrusion crosshead die adapted to insert a fibrous sheet into the extrudate prior to exiting from the die.

The initially formed sheet product comprises a continuous matrix of polymer-filler-processing agent with a fibrous sheet encapsulated between the two major surfaces of the sheet product. The majority or all of the processing agent is removed from the sheet product by suitable means, such as extraction of the agent with a liquid which is a solvent for the agent while being a non-solvent with respect to the polymer, filler and the fibrous sheet. The resultant sheet product has been found to have very high tensile strength, puncture resistance and wettability (capability to retain electrolyte) while exhibiting very low electrolytic resistance, high void volume, and can be formed in thickness of less than 50 mils, and even less than 10 mils.

Each of the components and the process to form the subject sheet product is described hereinbelow in detail.

The battery separator of the present invention is in the form of a very thin sheet product. It is composed of a homogeneous admixture of a polymer, and particulate filler in weight ratios of from 1:2.5 to 1:30 preferably 1:4 to 1:25 to provide a high filler content material. The sheet product further has a fibrous sheet internally encapsulated within the sheet product's thickness.

The present invention requires the utilization of a thermoplastic polymer which is inert with respect to the contemplated battery environment in which the resultant sheet product will be used. Illustrative of such thermoplastic polymer are polyolefins. The remainder of the description of the invention will use polyolefins for illustrative purposes.

The polyolefin must have an average molecular weight of at least 250,000, and can be selected from polyolefins having average molecular weights of from 250,000 to about 5,000,000. The polyolefin can be selected from homopolymers, such as polyethylene or polypropylene or from copolymers formed from a mixture of hydrocarbon olefin monomers, such as ethylene, propylene, butene and the like, or from a mixture of at least 90 percent by weight of hydrocarbon olefinic monomer with other olefinic monomer, such as acrylic and alkacrylic acids and their esters.

A preferred polyolefin to be used in the present invention are ultra high molecular weight polyolefins having a weight average molecular weight of at least about three million and generally from three to five million as determined by the procedure of ASTM D-4020 or DIN-53493 or by the Zero Tensile Strength Test (ZST) with a value of at least 0.1, preferably 0.1 to 1 Newtons/mm$^2$ and most preferably from 0.2 to 0.6 Newtons/mm$^2$. The polyolefin component may be composed of a mixture of polyolefins as, for example, mixtures of ultra-high molecular weight polyolefin and lower molecular weight polyolefin. The term "lower molecular weight polyolefins " refers to polyolefins having a weight average molecular weight of from 250,000 to about 2,500,000, preferably from 500,000 to 2,000,000. Such mixture can be formed from about 3 to 97 weight percent ultra-high molecular weight polymer with the corresponding about 97 to 3 weight percent of lower molecular weight polyolefin. It is preferred that the ultra-high molecular weight polymer be the major component of the polyolefin mixture.

Representative of polyolefins of high and low molecular weight which are operable in the instance invention are polyethylene, polypropylene, polybutene, ethylene-propylene copolymers, ethylene-butene copolymers, propylene-butene copolymers, ethylene-acrylic acid copolymers and the like. When an acrylic acid monomeric unit is present in at least one of the polyolefin constituents, it is preferred that it be a $C_1$–$C_3$ alkacrylic acid such as methacrylic acid, ethacrylic acid and the like or their $C_1$–$C_3$ alkyl esters. The preferred polyolefins are polyethylene, polypropylene and olefin-alkacrylic acid copolymers.

The polyolefin must be substantially insoluble in solvents used under the operating conditions employed to extract the polymer processing agent from the polyolefin-filler-processing agent composition, as fully described below. Such insolubility or inertness to the action of solvents may be due to the polyolefin's crystallinity content or by the judicious choice of solvent used in the extraction procedure. Partially crystalline polyolefins, such as polyethylene and isotactic polypropylene are ideally suited to the present application because they are substantially insoluble in common hydrocarbons and other organic aqueous solvents at low temperatures.

The filler required for the formation of the instant sheet product should, like the polyolefin component, be substantially insoluble in the solvent used to remove the processing agent and inert with respect to the battery environment (components and electrochemistry).

The fillers must be selected with respect to the end use of the sheet product formed. When the sheet product is to be used in an acid battery (e.g. lead-acid), the filler should be insoluble with respect to the battery acid. Similarly, when the sheet product is used in an alkaline battery (e.g. Ni-Zn) the filler must be alkali insoluble. Fillers which are non-reactive with respect to both acid and alkaline material can be used in either system.

Representative of the fillers which can be used in forming the sheet product of the instant invention are carbon black, coal dust and graphite; metal oxides and hydroxides such as those of silicon, aluminum, calcium, magnesium, barium, titanium, iron, zinc, zirconium, and tin; metal carbonates such as those of calcium and magnesium and the like. When the sheet product is used as a separator in an acid battery, the most preferred filler is silica such as precipitated silica, fumed silica and the like. When the sheet product is used as a separator in an alkaline battery, the most preferred fillers are titania, zirconia, alumina, as well as magnesium or calcium hydroxide and, most preferably, these filler materials should have the surface area of from 100 to 385 m$^2$/cc and pore volume (BET) of at least 0.075 cc/gm. Carbon black, coal dust, graphite and the like can be used (usually in less than 10, preferably less than 5 weight percent) in forming sheet products contemplated for use in either acid or alkaline systems.

The filler to be used in forming the polymer/filler/processing agent mixture, described above and the resultant polymer/filler matrix should be of very small particulate material to aid in homogenizing the mixture. It is preferred that the particulate material have high surface area (BET; such as 20 to 950 m$^2$/gm, preferably at least 100 m$^2$/gm) and high pore volume (BET; at least about 0.2 cc/gm; preferably at least about 1 cc/gm). The size of the ultimate (non-agglomerated) filler homparticulate material should be preferably ultra small having an average diameter of from about 0.01 to about 75 microns. The low end of this particulate size range refers to single particles while the upper end of the range may include agglomerate material as well where the particles exhibit such tendency. The particle size is preferably from about 0.01 to about 50, most preferably 0.1 to 25 microns. The filler should be substantially free of large (greater than 100 microns diameter particulate material whether as ultimate or agglomerate material).

As stated above, the filler must be selected with respect to the battery environment with which the subject separator is intended for use. That is to say the particulate filler must be inert with respect to such end use battery environment. Therefore, alkali insoluble particulate such as titanium dioxide (preferred), oxides, hydroxides and carbonates of calcium, magnesium, iron and the like should be used only in sheet products which are ultimately formed into battery separators for alkaline batteries. Similarly, acid insoluble particulates such as silica (a precipitated silica is preferred) and the like should be used only in sheet products which ultimately are formed into battery separators for acid batteries. Certain particulates can be used in either acid, alkaline or neutral battery systems and include carbon, coal dust, graphite and barium sulfate. Particulate materials which are inert to a battery system can be mixed to form the total filler content used in the sheet product.

The processing agent used in forming the present sheet product improves the processability of the composition, i.e., lower the melt viscosity and/or reduces the amount of power input which is required to compound and to fabricate the initial composition and initial sheet product obtained by the required process, as discussed below. The processing agent may be a compound or composition capable of lowering the melt viscosity of the thermoplastic polymer at the elevated temperature and pressure conditions of extrusion process described below, aid in homogenizing the polymer-filler mixture, and enhance the processability of the mixture during extrusion.

The processing agent can be soluble or insoluble in water provided it is soluble in a non-solvent with respect to the polymer, filler and fibrous sheet. Representative of the water-insoluble processing agent are organic esters, such as the sebacates, phthalates, stearates, adipates, and citrates; epoxy compounds such as epoxidized vegetable oil; phosphate esters such as tricresyl phosphate; hydrocarbon materials such as petroleum oil including lubricating oils and fuel oils and the like and mixtures thereof. Illustrative of the water-soluble plasticizers are ethylene glycol, polyethylene glycol, polypropylene glycol, glycerol, and ethers and esters thereof; alkyl phosphates such as triethyl phosphate, polyvinyl alcohol, polyacrylic acid and polyvinyl pyrrolidone and the like and mixtures thereof.

The preferred processing aid are hydrocarbon materials such as lubricating oils because they are economically effective and provide a high degree of plasticity to polyolefins under the process conditions used to initially form the present sheet product while being substantially insoluble and readily extracted from the resultant sheet product.

When a plasticizer is used which is not totally removed from the composition during the extraction step but forms part of the battery separator, it may aid in imparting flexibility to the resultant sheet product.

The sheet product of the present invention has a fibrous sheet contained within the thickness of the sheet product. The fibrous sheet can be in the form of a scrim, a woven, non-woven or knit material and can be formed from a continuous or non-continuous fibrous material. The material used to form the sheet component of the sheet product must be a material which is inert to the battery environment. Although the sheet component is contained in the interior of the sheet product's thickness, it is contacted with electrolyte solution (including cathodic and anodic material in the solution) as the solution passes through and is contained in the separator. Thus, the fibrous material can be, for example, selected from glass, polyolefin, polyester or polyacrylonitrile polymer filaments or mixtures or copolymers formed with other stable monomeric units (i.e. polyacrylonitrile/polyacrylic acid copolymer; polyolefin/polyacrylic acid copolymer) when the sheet product is used to form a battery separator for acid battery utility. Glass and polyester fibrous sheet are preferred for acid battery utility. Sheets formed from polyamides and the like are suitable to form sheet products for alkaline battery separator application. The sheet should be planar (that is, have substantially planar major surfaces) to assure that the sheet is encapsulated within the body (or thickness) of the sheet product. The sheet is preferably formed from a substantially uniform, thin denier thread (denier of from about 0.02 to 10) to also assure that the sheet is contained within the body of the sheet product. The sheet should have a tensile strength of at least 5 p.l.i. The particular thickness of the sheet should be less than about 0.8 (preferably less than about 0.6) of the thickness of the sheet product. The sheet should extend for substantially the full length and breadth of the resultant sheet product and be contained in the middle or skewed within the sheet product's thickness.

The sheet must be formed of fibrous material which is stable at elevated temperatures used in the process of forming the present sheet product. Thus, the fibrous material must have a glass transition temperature which is at least 10° C., preferably at least 20° C. above the operating temperature of the crosshead die used in the extrusion process described below.

The Polymer/filler/processing agent composition must be initially mixed into a substantially uniform mixture by conventional manners. For example, the components can be premixed at room temperature in a blender and then fluxed in a conventional mixer such as a Banbury mixer or melt blended in a two roll mill.

In order to form the subject sheet product, the polymer/filler/processing agent composition must be impregnated into the porous sheet in a manner which causes the composition to be uniformly distributed throughout the thickness of the sheet and to extend on each side thereof to have a polymer/filler/processing agent composition forming each major surface of the initial and resultant sheet product.

The highly filled nature and very high viscosity of the processing mixture requires specific processing conditions to achieve the present sheet product. It has been unexpectedly found that the subject process mixture can be formed into the desired sheet product by extrusion technique with the use of a cross head die adapted to provide a ribbon or planar sheet product of the desired width. Crosshead dies are known and conventionally used to coat single wire to provide a coated wire or a series of wires to provide a ribbon cable of the wires.

In a crosshead die, the inlet flow of the processing mixture is perpendicular to the outlet flow. Thus, the processing mixture proceeds through a conventional extrusion apparatus in which the mixture is transported through its chambers while heating and delivered to the inlet of the cross head die. The heating can be done in series. The normal operating temperature will depend on the glass transition temperature of the particular thermoplastic polymer being used and the desired melt viscosity to provide uniform extrudate. With respect to polyolefin-filler compositions as contemplated herein, the operating temperature ranges from about 190° C. to 240° C. In the die, the processing mixture makes a 90° turn and splits to provide two feeds (one upper and one lower). At the same time, the fibrous sheet is fed into the die through a separate mandrel and is positioned between the two feeds within the die. The processing mixture feeds and the fibrous sheet meet close to the die's exit. In this region, the mixture from the feeds recombine while encapsulating the fibrous sheet within its core.

The initially formed sheet product is removed from the cross-head die, may be subjected to calendaring to establish a uniform thickness and/or to impart ribs on the die (by using a grooved roller) and then allowed to at least partially cool before subjected to extraction to remove the processing agent.

The procedure for extraction of the processing aid from a sheet product is well known and is not meant to form a part of the present invention, per se. A single or multiple stage extraction can be used. The solvent or extraction conditions should be chosen so that the polymer, fiber sheet and filler components are essentially insoluble. For example, when petroleum oil is to be extracted from the composition sheet, the following solvents are suitable; chlorinated hydrocarbons, such as trichloroethylene, perchloroethylene, carbon tetrachloride, methylene chloride, 1,1,1-trichloroethane, and the like; hydrocarbon solvents such as hexane, benzene, petroleum ether, toluene, cyclohexane, gasoline, and the like. If water soluble processing aids are to be extracted, the extraction medium can be water, ethanol, methanol, acetone, and the like.

The extraction temperature can range anywhere from room temperature up to a temperature below (preferably at least 10° C. below) the lowest melting or degradation temperature of the polymer, filler and fiber used.

The time of the extraction will vary depending upon the temperature used and the nature of the processing aid being extracted. For example, when a higher temperature is used, the extraction time for an oil of low viscosity may be only a few minutes, whereas, if the extraction is performed at room temperature, the time requirement for a polymeric processing aid can be in order of several hours.

The composition of the resultant sheet product will depend upon the degree of extraction of the processing agent. The processing agent can be substantially completely removed, leaving a highly filled polymeric sheet product or, alternatively, can have 60 percent and, preferably, 75 percent of the processing agent of the mixture removed. The resultant sheet product is thus composed of polymer-filler matrix having the 1:2.5 to 1:30 wt. ratio as in the initial processing mixture with from 0 to about 20 wt. percent, preferably from 0 to 15 wt. percent and most preferably from 0 to 10 wt percent processing agent incorporated therein. The microporous layer of the sheet product normally has from about 5 to 25 weight percent polymer, about 75 to 95 weight percent filler and from 0 to 10 percent processing agent.

The resultant sheet product is a microporous sheet of very high porosity (porosity of at least 45 vol. percent, preferably greater than 55 vol. percent and even up to 80 vol. percent). The sheet product has a length and breadth and a predetermined thickness which should be less than about 50 mils, preferably less than about 20 mils, and most preferably less than about 10 mils. Very thin, flexible sheet products having good mechanical properties of tensile strength and modulus of elasticity have been unexpectedly formed. It is well known that the inclusion of high levels of particulate filler into a polymeric matrix would presumably cause the sheet product to have increased brittle characteristics while the high porosity would be presumed to cause a sheet product of very low tensile strength and poor integrity. Previously known filled polyolefin sheet products are limited in their ability to retain integrity when the polymer to filler content is greater than about 1:2. In contrast, it has been unexpectedly found that the sheet product of the present invention provides all of the desired properties for a battery separator including strength, flexibility, very low electrolytic resistance, good integrity, etc.

The sheet product is a flexible material capable of being folded upon itself and formed into an envelope design. This is surprising in view of the high amount of filler contained in the present composite separator. Logic argues that the product should be stiff, brittle and inflexible. Yet the combination of the elements of the present invention provides a flexible, ductive product that can be easily folded.

The sheet product can be cut into suitable shapes to be used as a separate between electrodes of a battery such as a leaf separator. The separator should extend the full length and width of the electrode to prevent electrodes of opposite polarity from contacting one another. In certain instances, it is preferred that the separator be void of patterns or other raised sections e.g. flat sheet (generally for alkaline batteries) or may contain raised portions, such as ribs, buttons or the like (generally for acid batteries). The ribs or other raised portions can be formed from any polymeric material capable of adhering to the polymer used to form the base sheet product or can be made as part of the extrusion die outlet port design or can be formed by patterned calender rollers.

The instant process and compositions produce microporous battery separators which exhibit low electrolytic resistance, readily permits electrolytic conductivity via the electrolyte, and possess excellent tensile properties to accommodate the various physical operation. In addition, the present separator exhibits a high degree of stability and lack of degradation to the various chemical and electrochemical forces encountered in the battery.

A further improvement of the present invention is that the material is dimensionally stable, both during processing and use. Typically, plastic separators undergo some shrinkage during processing and use. For example, it has not been uncommon for separators formed of plastic and an inert filler to undergo a 10% reduction in width and length during extraction of the processing aid. This results in reduced porosity or reduced yield. Similarly, shrinkage is known to occur in the finished battery after the separator has been formed as an envelope around the electrode. Shrinkage in the battery exposes portions of the active material which may fall off or dry out or in the worst case contact an electrode of opposite polarity causing a short.

A further unique feature of the present invention is the sheet product has the enhanced properties attributable to the fibrous sheet without having fibrous material exposed on the sheet products major surfaces. Thus, these major surfaces are substantially smooth and do not have the tendency to cause tangling or catching of battery components in the assembling process.

A further unique feature of the present invention is the ability of the sheet product to have an ultra-high content of inert filler. This filler (such as silica) imparts hydrophilic properties to the sheet product. Thus, the separator formed of the sheet product is capable of retaining aqueous electrolyte solution and thereby aids in having the electrodes operate at peak efficiency.

A further unique feature of the present invention is that rib designs can be readily formed on one or both surfaces of the sheet product during its extrusion processing.

A still further unique feature of the present invention is that the formed sheet product can have very high porosity of up to about 80 volume percent without losing its integrity. In addition, it is believed that the porosity of the sheet product is of a gradient nature with small micro-pores adjacent to each major surface of the sheet product (e.g. within the polymer filled matrix) and to further contain higher porosity internally. This higher porosity is believed due to extended pores formed along the interface of the fibers of the fibrous sheet and the polymeric matrix. This is particularly so where fibers are composed of different material from the polymer used in forming the matrix composition. For example, when the polymer is a thermoplastic, preferably a polyolefin and the form stable layer is formed of glass fibers, it has been found that the two materials, have hydrophobic and hydrophilic properties, respectively, and therefore do not substantially bond to each other readily. This leads to the formation of unique extended, elongated pores at the interface area. The pores are particularly suited for the retention of electrolyte within the separator. This is of particular interest to one in the battery field as it allows for the inclusion of more electrolyte in a given battery space than had previously been available. The increase in electrolyte allows for higher storage capacity and reserves, thus providing a better, stronger battery than had been previously available.

The following examples are given for illustrative purposes only and are not meant to be a limitation on the invention as defined by the claims appended hereto. All parts and percentages are by weight unless otherwise indicated. The formed sheet products were tested for electrolytic resistance (ER) in 35 weight percent $H_2SO_4$ or 33 weight percent KOH solution as appropriate, according to the ER determination described in Cooper and Fleischer, "Characteristics of Separators for Alkaline Silver oxide, Zinc Secondary Batteries: Screening Methods" Air Force Aero Propulsion Laboratory, Sep., 1965.

The puncture resistance was determined by using a cylindrical puncture pin with a hemispherical tip. This pin is part of a puncture test apparatus (Chatilion Gauge DPP2). The pin is pressed through the specimen and the ultimate force measured and reported as puncture strength.

EXAMPLE I 10 parts of polyethylene having a weight average molecular weight of 3,000,000 (Hoechst-Celanese GUR 413), 26 parts of precipitated silica (acid resistant grade) PPG "SBG"), 63 parts hydrocarbon naphthenic oil (Shellflex 3681) and 1 part carbon (Schulman Polyblak 3758 composed of 50% carbon/50% low molecular weight polyethylene) were mixed together in a single planatary mixer (Hobart mixer) to form a homogeneous mixture of the components. The mixture was then passed through a twin screw extruder to compound the mixture into ⅛ inch strands which were cut into pellet material. The pelletized material was introduced into a second twin screw extruder. In each of the extrusions, the extruder had a 30 millimeter diameter by 870 millimeter long bore which was equally divided into 5 heating zones of 200°/205°/210°/215°/220° C. respectively from feed to die head. The extruder further mixes and pumps the melted material to the die. At the end of the bore adjacent to the die head, the melt temperature was 217° C., the extrusion torque was 39% of the extruder's maximum capacity and the pressure was 1570 psi. The second extrusion was conducted using a cross-head die having a 1.5 by 0.016 inch wide opening. The extruder screw speed was 11 rpm. A non-woven glass (acid resistant) fiber having a dimension of 1.5×0.006 inch (0.72 oz/yd$^2$) was introduced into the cross-head die prior to initiating feed of the filled-polymer material. The fiber was encapsulated into the filled polymer matrix which exited the port of the die.

The resultant sheet was passed through a set of calender rollers causing excess polymer to be removed to the outside edges of the formed sheet. The calender rollers were water cooled to 30° C., had dimensions of 4 inch dia. by 10 inch wide, and were operated at a pressure of 60 psi. The resultant sheet was formed at a rate of 2.7 ft/min. The excess filled polymer at the edges were trimmed and the formed sheet was taken up on a wind-up roll.

The oil of the extruded sheet was extracted by subjecting the sheet to hexane wash at 25° C. with a residence time sufficient to remove about 80% of the oil content. The sheets were cut into suitable dimension for use as separator. The material was also tested for its capability to seal into an envelope design.

The resultant sheet had a thickness of 22 mils. The material was heat sealable. The sheet exhibited excellent physical properties of puncture strength of 7.0 lbs, tensile strength of 1827 psi and tensile elongation of 51%. The porosity was 61% with an average pore diameter (Hg intrusion) of 0.019 μm. The electrical resistance was determined to be 2.7 ohm-cm.

For comparative purpose, a sheet product without fibrous sheet was formed having the same silica, polymer and carbon content and ratio. This sheet product was formed using the same double extrusion technique with a conventional slit die on the second extrusion. The resultant sheet of 11 mils thickness was much weaker and more penentrable. The puncture resistance was only 2.2 lbs; tensile strength of 1749 psi and elongation of 192%. The average pore size was 0.016 μm. The electrical resistance was found to be 2.4 ohm-cm.

EXAMPLE 2

A sheet product was formed in the same manner as described in Example 1 above except that the components were used in the following amounts: 4 parts polyethylene, 27 parts silica; 68 parts oil; and 1 part carbon-/oil composite.

The extrusion was conducted in the manner described above except that the measured extrusion tongue was 31% of capacity and the extrusion pressure was 1580 psi. The resultant sheet was 24 mil thick.

The resultant product had a very high (6:1) silica to polymer weight ratio yet exhibited superior strength and good wettability while providing good electrical resistance values.

The sheet product had puncture resistance of 6.3 lbs, tensile strength of 1307 psi and elongation of 38%. The pore volume was 50% and the average pore size was 0.019 μm. The electrical resistance was 4.5 ohm-cm.

In comparison, two additional samples were made by the same double extrusion process. The first was formed using a conventional slit die to form a sheet having silica/polymer in a 6:1 weight ratio without a fibrous sheet. The second was formed by applying the fibrous sheet to the polymer-filled sheet at the calendar rollers.

The first comparative sample was very weak and penetrable. Its puncture resistance was only 0.7 lbs, while its tensile strength was 979 psi and tensile elongation was 45%. This sheet would not withstand processing conditions encountered in battery assembly.

The second comparative sheet was substantially weaker than the sheet of the present invention. It exhibited puncture resistance of only 2.1 lb; tensile strength of 903 psi; and tensile elongation of 54%.

EXAMPLE 3

A sheet suitable for use in an alkaline battery was formed in the same manner as described in Example 1 except that the silica filler was replaced with titanium dioxide (rutile)(Kemira Unitane OR-460). The amount of each component was 3 parts polyethylene, 72 parts $TiO_2$, 24 parts hydrocarbon oil and 1 part carbon/-polyethylene composite. This resulted in a fiber encapsulated sheet having a 24:1 filler to polymer weight ratio.

The resultant sheet had a thickness of 21 mils and exhibited good puncture resistance, tensile strength and low electrical resistivity. The puncture resistance was 5.5 lbs; tensile strength was 1996 psi and elongation was 85%. The sheet had a pore volume of 48% and an average pore size of 0.024 μm. The electrical resistance was 2.7 ohm-cm.

What is claimed:

1. A microporous sheet product having a length and breadth and a thickness of less than about 50 mils between a first major surface and a second major surface composed of a uniform mixture of a polyolefin having a weight average molecular weight of at least about 250,000 and an inert filler in a weight ratio of from 1:2.5 to 1:30 and a fibrous sheet extending the length and breadth and encapsulated within said thickness of the sheet product.

2. The sheet product of claim 1 wherein the polyolefin has a weight average molecular weight of at least 3,000,000.

3. The sheet product of claim 1 wherein the polyolefin is a mixture of a major amount of at least one polyolefin having a weight average molecular weight of at least 3,000,000 and a minor amount of at least one polyolefin having a weight average molecular weight of from 250,000 to 2,000,000.

4. The sheet product of claim 2 wherein the fibrous sheet is formed of woven or non-woven glass or polyester fibers and the filler is composed of silica with up to about 10 percent of filler being carbon.

5. The sheet product of claim 3 wherein the fibrous sheet is formed of woven or non-woven glass or polyester fibers and the filler is composed of silica with up to about 10 percent of filler being carbon.

6. The sheet product of claim 2 wherein the fibrous sheet is formed of woven or non-woven polyamide fibers and the filler is selected from titania, alumina, zirconia, magnesium, hydroxide or calcium hydroxide with up to about 10 percent of filler being carbon.

7. The sheet product of claim 3 wherein the fibrous sheet is formed of woven or non-woven polyamide fibers and the filler is selected from titania, alumina, zirconia, magnesium, hydroxide or calcium hydroxide with up to about 10 percent of filler being carbon.

8. The sheet product of claim 1 wherein the porosity is at least 45 volume percent, the average pore volume is from 0.01 to 10 microns and contains extended pores at the interface between the polyolefin/filler mixture and fibers of the sheet contained therein.

9. The sheet product of claim 2 wherein the porosity is at least 45 volume percent, the average pore volume is from 0.01 to 10 microns and contains extended pores at the interface between the polyolefin/filler mixture and fibers of the sheet contained therein.

10. The sheet product of claim 3 wherein the porosity is at least 45 volume percent, the average pore volume is from 0.01 to 10 microns and contains extended pores at the interface between the polyolefin/filler mixture and fibers of the sheet contained therein.

11. A microporous sheet product formed by the process of
   a) forming a uniform mixture of from about 2 to 20 wt. percent of a polyolefin, having a weight average molecular weight of at least about 250,000 from about 20 to 75 of an inert filler having an average particle size of less than 100 microns and remainder of a processing agent capable of plasticizing said polyolefin at elevated temperatures;
   b) extruding the resultant mixture of step a) at elevated temperature and pressure through a crosshead die having a slit exit port concurrently with a non-woven or woven fibrous web formed from fibers stable at the extrusion operating temperature to produce an initial sheet product;
   c) extracting at least 60 percent of the processing agent from the initial sheet product to provide a resultant sheet product having a length and breadth and a thickness of less than 50 mils between its first major surface and second major surface said thickness composed of a substantially uniform matrix of polyolefin, inert filler and residual processing agent, and having the fibrous sheet extending the length and breadth and encapsulated within the matrix, said sheet product being microporous having a void volume of at least 45 vol. percent composed of average diameter of from 0.01 to 10 microns.

12. The sheet product of claim 11 wherein the polyolefin has a weight average molecular weight of at least 3,000,000.

13. The sheet product of claim 11 wherein the polyolefin is a mixture of a major amount of at least one polyolefin having a weight average molecular weight of at least 3,000,000 and a minor amount of at least one polyolefin having a weight average molecular weight of from 250,000 to 2,000,000.

14. The sheet product of claim 12 wherein the fibrous sheet is formed of woven or non-woven glass or polyester fibers and the filler is composed of silica with up to about 10 percent of filler being carbon.

15. The sheet product of claim 13 wherein the fibrous sheet is formed of woven or non-woven glass or polyester fibers and the filler is composed of silica with up to about 10 percent of filler being carbon.

16. The sheet product of claim 12 wherein the fibrous sheet is formed of woven or non-woven polyamide fibers and the filler is selected from titania, alumina, zirconia, magnesium, hydroxide or calcium hydroxide.

17. The sheet product of claim 13 wherein the fibrous sheet is formed of woven or non-woven polyamide fibers and the filler is selected from titania, alumina, zirconia, magnesium hydroxide or calcium hydroxide.

18. The sheet product of claim 11 wherein the porosity is at least 45 volume percent, the average pore volume is from 0.01 to 10 microns and contains extended pores at the interface between the polyolefin/filler mixture and fibers of the sheet contained therein.

19. The sheet product of claim 12 wherein the porosity is at least 45 volume percent, the average pore volume is from 0.01 to 10 microns and contains extended pores at the interface between the polyolefin/filler mixture and fibers of the sheet contained therein.

20. The sheet product of claim 13 wherein the porosity is at least 45 volume percent, the average pore volume is from 0.01 to 10 microns and contains extended pores at the interface between the polyolefin/filler mixture and fibers of the sheet contained therein.

21. A battery having positive electrodes, negative electrodes, electrolyte and a separator positioned between each positive and negative electrode pair, wherein the improvement comprises that the separator is in the form of a sheet, leaf or envelope formed from the sheet product of claim 1.

22. A battery having positive electrodes, negative electrodes, electrolyte and a separator positioned between each positive and negative electrode pair, wherein the improvement comprises that the separator is in the form of a leaf or an envelope formed from a sheet product of claim 2.

23. A battery having positive electrodes, negative electrodes, electrolyte and a separator positioned between each positive and negative electrode pair, wherein the improvement comprises that the separator is in the form of a leaf or an envelope formed from a sheet product of claim 3.

24. A battery having positive electrodes, negative electrodes, electrolyte and a separator positioned between each positive and negative electrode pair, wherein the improvement comprises that the separator is in the form of a leaf or an envelope formed from a sheet product of claim 4.

25. A battery having positive electrodes, negative electrodes, electrolyte and a separator positioned between each positive and negative electrode pair, wherein the improvement comprises that the separator is in the form of a leaf or an envelope formed from a sheet product of claim 5.

26. A battery having positive electrodes, negative electrodes, electrolyte and a separator positioned between each positive and negative electrode pair, wherein the improvement comprises that the separator is in the form of a leaf or an envelope formed from a sheet product of claim 6.

27. A battery having positive electrodes, negative electrodes, electrolyte and a separator positioned between each positive and negative electrode pair, wherein the improvement comprises that the separator is in the form of a leaf or an envelope formed from a sheet product of claim 7.

28. A battery having positive electrodes, negative electrodes, electrolyte and a separator positioned between each positive and negative electrode pair, wherein the improvement comprises that the separator is in the form of a leaf or an envelope formed from a sheet product of claim 8.

29. A battery having positive electrodes, negative electrodes, electrolyte and a separator positioned between each positive and negative electrode pair, wherein the improvement comprises that the separator is in the form of a leaf or an envelope formed from a sheet product of claim 9.

30. A battery having positive electrodes, negative electrodes, electrolyte and a separator positioned between each positive and negative electrode pair, wherein the improvement comprises that the separator is in the form of a leaf or an envelope formed from a sheet product of claim 10.

31. A battery having positive electrodes, negative electrodes, electrolyte and a separator positioned between each positive and negative electrode pair, wherein the improvement comprises that the separator is in the form of a leaf or an envelope formed from a sheet product of claim 11.

* * * * *